C. E. FOUTS.
DEVICE FOR PREVENTING BACK FIRING.
APPLICATION FILED JUNE 2, 1913.
1,105,556.
Patented July 28, 1914.
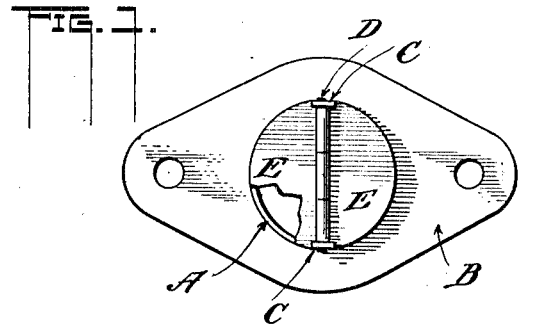
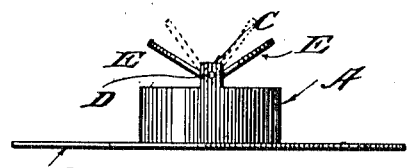
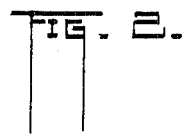
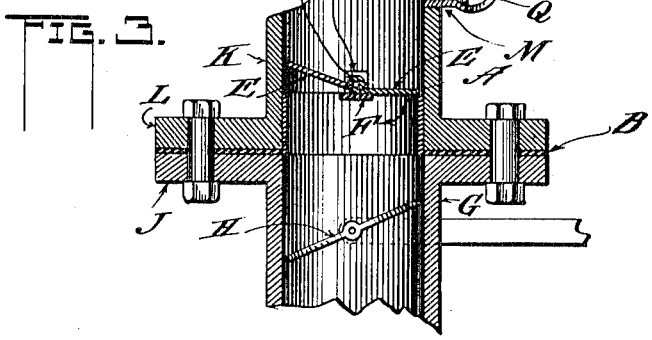
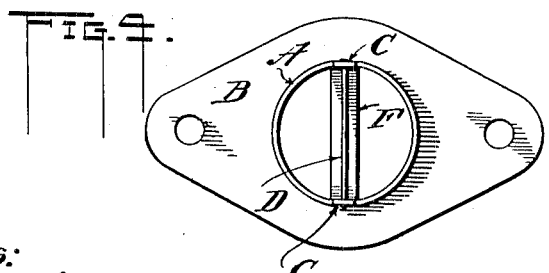
Witnesses:
Marie Dacey
Eunice M. Peckum
Inventor:
Cyrus E. Fouts,
By L. M. Shunk
Atty.

UNITED STATES PATENT OFFICE.

CYRUS E. FOUTS, OF WYOMING, ILLINOIS, ASSIGNOR OF ONE-HALF TO FRANK E. HARTZ, OF WYOMING, ILLINOIS.

DEVICE FOR PREVENTING BACK-FIRING.

1,105,556.   Specification of Letters Patent.   Patented July 28, 1914.

Application filed June 2, 1913. Serial No. 771,247.

*To all whom it may concern:*

Be it known that I, CYRUS E. FOUTS, citizen of the United States, residing at Wyoming, in the county of Stark and State of Illinois, have invented certain new and useful Improvements in Devices for Preventing Back-Firing; and I do hereby declare that the following is a full, clear, and exact description of the invention, which will enable others skilled in the art to which it appertains to make and use the same.

This invention relates to a device for preventing "back firing" in explosion engines.

It is well known that back firing from the engine through the carbureter often sets fire to the gasolene creating considerable annoyance and often considerable damage and this is especially true of automobiles.

The purpose of the present invention is to eliminate this trouble by placing in the manifold pipe or the carbureter, or between said pipe and carbureter, a valve that will open in one direction only to permit the passage of gas from the carbureter toward the engine but absolutely prevent any return through said carbureter. I am aware that it is not new to place a valve for this purpose between the engine and carbureter with the same object in view, but the purpose of my invention, more particularly, is to produce a new simple type of valve of a small size but of large opening and so constructed that it can be placed between the flanges which secure the manifold pipe to the carbureter. However, it can be placed in some other position requiring little space and also that the valve itself will lie in the conduit of one of these members. The valve is of a type that will not restrict the passage in which it is placed and will not require a special structure or an enlargement of the parts in which it is placed to accommodate it. In the known type referred to a special structure of parts is required in the carbureter or manifold pipe but it is my purpose to so construct my device that it can be placed in any machine without change in its parts.

To the end that my device will be fully understood I have provided the accompanying drawing, in which:

Figure 1 is a plan of my invention. Fig. 2 is a side elevation of the same. Fig. 3 shows the flanged portions of the manifold pipe and carbureter with my invention in connection therewith, and, Fig. 4 is a plan of the invention with the valve parts removed to show certain structures.

The device consists of a tubular part A, and a suitable flange portion B adapted to be clamped between the flanges of the parts of the pipe structure. The said tubular portion opens through the flange portion as indicated in Fig. 3 and at diametrically opposite sides of said portion and extending above its upper end is an ear or part C through both of which extends a hinge pin D. E E are two half-valves carried by said hinge pin, said valves being in the nature of check valves. They lie upon the end of the tubular portion A and tightly close the same and open only in one direction or away from said open end, as indicated in Fig. 2.

Preferably extending centrally across and spanning the tubular portion is a bridging member F whose upper surface is flush with the end of said tubular portion and upon which the under surfaces of the valves E lie at their hinged parts as indicated in Fig. 3. In this figure G indicates a tubular portion of the carbureter including the usual butterfly or throttle valve H. The said portion G is provided with a flange J.

K indicates one end of the manifold pipe of an engine which is provided with a flange L corresponding to the flange J. These flanges are usually bolted together, the gas from the carbureter being drawn into said pipe K to the engine. My device is adapted to be clamped between these two flanges, as shown, or others farther up the pipe, if such are used, the tubular portion A extending up into the said manifold pipe as clearly shown.

Former devices for preventing back firing either include a specially constructed carbureter or a specially constructed fitting to be placed in the manifold pipe and these because specially constructed involve considerable expense in manufacture besides requiring a rearrangement of the pipe system to accommodate it.

In automobile construction, particularly, it is very often impossible to provide space between the carbureter and engine in which to introduce a fitting because the space is often limited but my device is of such a form that it can be placed in the pipe, its thin flange being easily placed between the flanges. Furthermore, former valves used in these fittings, or the carburetor, necessitated a specially constructed enlarged portion so arranged as to permit the valve to operate without constricting the passage leading to the engine. It is important, of course, to provide always against reducing the cross sectional area of the passage leading to an explosion engine which has been carefully figured by the makers. My device can be introduced into the gas passage without the slightest change in those parts, the valve parts E by reason of their form readily permitting the gas to pass. The flange B is made comparatively thin so that it serves the purpose of a packing between the flanges J L and may be used for that purpose. The tubular part A slips into the manifold pipe and occupies a vertical position therein so that the said valve parts will close by gravity in the absence of means to close said valve-parts after each passage of gas.

A relief valve or check-valve is fitted into an opening M in the wall of the manifold pipe between the engine and my improved device, and consists of a tubular portion N and an arched portion O. The valve is represented at P and seats in said tubular part N in such a way as to prevent the intake of air to the manifold pipe; being held in its seat by a spring Q.

As the gas is drawn from the carburetor G into the manifold pipe the valves E E are lifted as shown in Fig. 2, by the suction and after the suction stroke is completed they close by gravity, or, means may be provided to assist said valves to close after the charge of gas has been drawn through and this would be advantageous where the device occupies any other position than an upright one in a vertically disposed passage, but this considered as lying within the invention. After the charge of gas has been drawn through and the valves E have closed the pressure of a "back fire" within the manifold pipe will be relieved through the valve Q, and under no circumstances can the flame pass into the carburetor and set fire to the gasolene.

It is observed that since the valves E are hinged in the middle of the part A they must swing up toward the center of the passage and must necessarily provide a considerable extent of opening so that the pipe will not be constricted but will admit of an opening as large or larger than the opening provided by the butterfly valve H and all without a special structure. I preferably provide the cross member F described herein upon which the portions of the valves E rest at the hinge so that there will be no possible openings through which the flames in back firing can get back into the carburetor. This said member also adds strength to the tubular member A preventing it from injury before being placed in position for service. However, this may not be used.

It is clear that if a one-piece valve were used of a diameter sufficient to close the passage and were pivoted at one side it would be prevented from lifting within the pipe by reason of the small diameter of the latter. And without the provision of an enlarged part to permit the valve to lift and to give the proper opening of the pipe without constricting the passage-way such a form could not be used.

The flange B may be of any desired form, that shown corresponding to the form of flanges between which it is clamped. Again, the tubular part A may project beyond the flange B in either direction and the extremities of said tubular part would therefore lie within a part of the pipe K and part of the carbureter.

I may make slight changes in my device but such changes will be such as to lie within the spirit of the invention and the meaning of the appended claims.

I prefer to use the two valves E in order to provide the largest opening possible or so that there will be no constriction of the passage. Where the throttle is opened but very little, for example when the engine is to run at low speed, the valves will raise but very little or only sufficient to admit the required amount of gas to pass and of course at such times even the lifting of one of the valves would be sufficient and in fact but one valve would perhaps suffice where an engine were required to operate only at slow speeds at all times.

I am not aware of a check valve that, due to its structure, can be placed in the passageway for vapor leading to a gas explosion engine at the place of connection of the carburetor with the manifold pipe, especially when used in connection with automobiles and where it can be put in position without change in the structure of the parts of the pipe or connections and by reason of which, also, the device can be made a separate article of manufacture adapted to any style, make or construction of vehicle.

The valves E E must be limited in their upward movement so that neither of them can be thrown over upon the other under sudden, sharp suctions and in consequence the ears C or any other equivalent means is employed to limit the upward movement of both. Since the said ears, or their equivalents, must be used to carry the hinge pin D they are utilized to limit said movement, said valves being notched around said ears and these notches are extended sufficiently to permit the valves to lift to the required height, see Fig. 2, and yet limit their movement as explained. The valves must, of course, be slightly smaller in diameter than the manifold pipe so that they will not rub on the inner walls of the same and yet they must lie upon the latter to prevent the flame passing into the carbureter pipe.

Having described my invention what I believe as new and desire to secure by Letters Patent is:

1. In a device for the purposes set forth, the combination of a tubular part, two valve portions to lie upon the open end of the same adapted to tightly close it, said portions being hinged across the said open end, and adapted to be lifted by the suction through the part, a member extending across the open end beneath the hinge of the valve portions, the latter lying thereon when closed, said member adapted to prevent flame passing through the hinge portions into the said tubular part.

2. In a device for the purposes set forth, the combination of a tubular part, a member extending across the open end of the same, and a pair of hingedly related valve portions normally lying upon the end of the tubular part and upon said member and adapted to tightly close said tubular part, their hinged portions lying adjacent to and upon said member.

3. In a device for the purposes set forth, the combination of a tubular part, a member extending across the open end of the said part at its greatest diameter and having its upper surface substantially flush with the end of said tubular part, a pair of valve portions hinged adjacent the member parallel thereto and adapted to lie upon said member and the said end of the tubular part to be lifted therefrom, and means to limit the lifting movement of the valve portion.

4. An article of manufacture consisting of an open tubular part including a flange surrounding it at one end, a member extending across the opening of said part at its other end substantially at its greatest diameter, an extension projecting from said other end at diametrically opposite sides of the latter, one lying opposite each end of the said member, and a pair of valve portions hinged between the extensions and adapted to normally lie upon the member and upon the end of said tubular portion, the extensions adapted to limit the movement of the valve portions in one direction.

5. An article of manufacture consisting of an open tubular part, including a flange at one end lying in a plane substantially perpendicular to the axis of said tubular part, a member extending across the opening of the part at its other end and leaving an opening at each side thereof, an extension projecting from said other end at diametrically opposite sides of the latter, one lying opposite each end of the said member, and a pair of valve portions hinged between the extensions and supported between them, said portions adapted to normally lie upon the member and upon the end of said tubular portion, the same including notches opposite the edges of the extensions and in planes substantially perpendicular to the hinge, the said extensions adapted to limit the movement of the valve portions in one direction.

In testimony whereof I affix my signature, in presence of two witnesses.

CYRUS E. FOUTS.

Witnesses:
D. J. COLGAN,
HAZEL E. SELLON.